United States Patent [19]
Phillips

[11] 4,010,352
[45] Mar. 1, 1977

[54] ZRO₂-BASE HEATING ELEMENTS

[76] Inventor: Bert Phillips, 1220 S. Garner St., State College, Pa. 16801

[22] Filed: May 21, 1975

[21] Appl. No.: 579,553

[52] U.S. Cl. .................................. 219/553; 13/25; 338/332; 219/540

[51] Int. Cl.² .......................................... H05B 3/10

[58] Field of Search ........... 13/20, 22, 25; 219/523, 219/530, 540, 552, 553; 338/272, 322, 327, 332

[56] References Cited
UNITED STATES PATENTS

| | | | |
|---|---|---|---|
| 2,356,237 | 8/1944 | Geller | 13/25 |
| 2,397,445 | 3/1946 | Stupakoff | 338/222 X |
| 2,417,953 | 3/1947 | Stupakoff | 13/20 |
| 2,679,545 | 5/1954 | Kistler | 13/20 |
| 3,086,187 | 4/1963 | Duggan et al. | 338/332 X |
| 3,155,759 | 11/1964 | Marshall | 13/25 |
| 3,538,231 | 11/1970 | Newkirk et al. | 13/25 |

*Primary Examiner*—Volodymyr Y. Mayewsky

[57] ABSTRACT

ZrO₂-base heating elements have been of interest for use in oxidizing atmospheres above 1600° C for a great many years, i.e. since it was shown that ZrO₂ could be used as a resistance heater. Many groups have used, with limited success, ZrO₂-base elements for laboratory use, but to date no company has produced an element satisfactory for production and industrial use.

I have developed a ZrO₂-base element which shows adequate usefulness to be produced in quantity and used in industry for satisfactory lifetimes relative to the other elements used at high temperatures.

4 Claims, 2 Drawing Figures

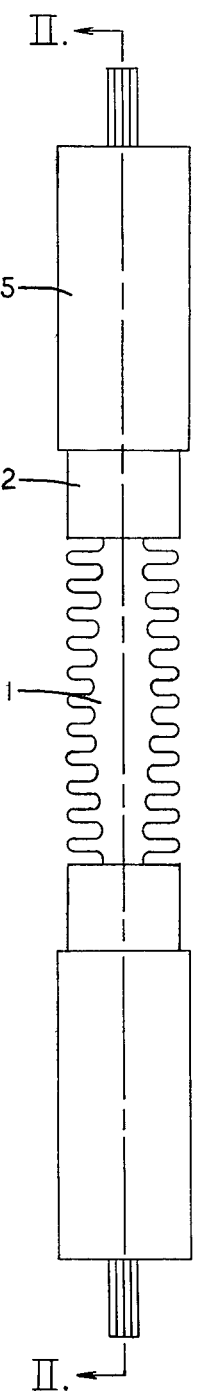
FIG. I.
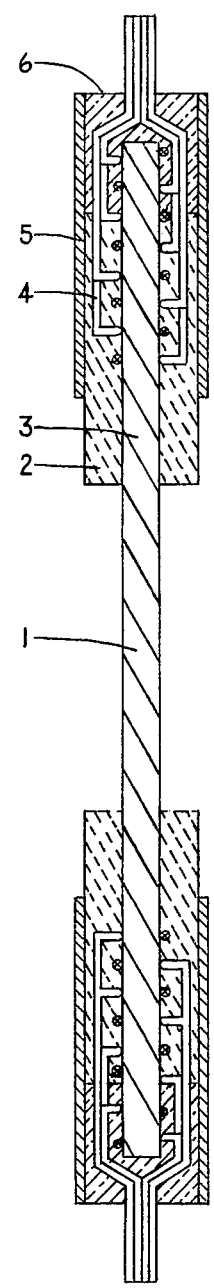
FIG. II.

ical to the view shown in FIG. I.

ZRO₂-BASE HEATING ELEMENTS

RELATIVE APPLICATIONS

I know of no applications currently on file related to the element under discussion nor based on $ZrO_2$ with established and documented performances as I disclose herein.

BRIEF SUMMARY OF THE INVENTION

My invention permits construction of $ZrO_2$-base elements without the problems that have prevented the wide spread use of $ZrO_2$-base elements for sustained high-temperature use. The problems to which I refer are: 1. Early deterioration of the terminal ends and 2. Channeling of the power into small cross sectional areas, a problem encountered often in dealing with materials having a negative coefficient of resisitivty.

The construction of the heating element of my invention is different from previously reported Zirconia heating elements. My construction calls for the use of a shaped element of stabilized Zirconia having a central heating section and fairly long and larger terminal ends to which are attached directly the incoming lead wires of high temperature alloy. The entire terminal section is then surrounded with a Zirconia-base castable to which has been added other oxides (such as NiO, $Li_2O$, etc.) which cause the castable to be more conductive and which during use, diffuse throughout the entire terminal making it more conductive than the central heating portion. This casting is made inside an insulation tube (either alumina or mullite) which prevents reaction of the terminal ends with the furnace refractories and insulation.

BRIEF DESCRIPTION OF THE DRAWING

My invention may be more fully understood by reference to the accompanying drawing in which:

FIG. I is a longitudinal view of the general appearance of the element, and

FIG. II is a section through the element perpendicular to the view shown in FIG. I.

According to the present invention, 1 is a shaped heating section of the element which provides more uniform temperature over the entire heating length. The cast section 2, a mixture of $ZrO_2$ with conduction-improvement additives surrounds the terminal ends of the element 3 and the electrical leads 4. Much of the extended part of the element is surrounded by insulator tubing 5 and closed off at the electrical lead end with an insulating type castable ceramic 6.

DETAILED DESCRIPTION

In FIGS. 1 and 2, the central or heating section of the element is either circular, square, or rectangular in cross section with a slight increase in cross sectional area at the center and tapering from the center towards the ends of the heating section. The radiating fins of the central heating section help to dissipate the power to the surroundings and thereby minimize overheating, and channeling. The fins can be on either two opposite sides or completely surrounding the heating section. The size and shape of fins are variable and not limited to the specific size and shape indicated.

Also, in FIGS. 1 and 2, the materials used to fill the space 2 about the terminal ends and within the insulator tubing 5, is predominately castable Zirconia with conduction-improving additives, such as NiO, $Fe_2O_3$, $Cr_2O_3$, $Li_2O$, etc. The additives greatly increase the current-bearing capacity of the terminals and do not adversely affect the melting or softening temperature. The terminals, operating cooler than the heating section, can tolerate the additives without deteriorating liquid formation. Such sections can be produced by several different methods commonly used in ceramic processing, such as, casting, pressing and sintering, isotatic pressing and firing, hot pressing, etc.

The electrical leads, 4, are of high temperature alloy such as Kanthal or Nichrome, extend deeply into the terminal section and are arranged to be in intimate or close contact with the end section of the element. As the deepermost sections of the leads oxidize, and they do slowly, they also provide some conduction-improvement materials to the $ZrO_2$-base terminals. It deserves mention that SiC leads may be used, but oxidation must be prevented or the layer of $SiO_2$ developed will electrically insulate the lead from the heating element, causing discontinuity or arcing.

The insulating ceramic, 6, can be of alumino-silicate, zircon, or other insulating materials and its type seems unimportant.

A few of the noteworthy characteristics of my invention are as follows:

Elements have been operated at 2000° C

Elements have been cycled several times from 1850° C to room temperature.

Elements were operated in series and parallel with current-controlling equipment.

Elements have been powered to much higher levels than commercially avaiable elements. (200 – 400 watts/square inch)

An element with a 12 inch heating length and one square inch cross section has performed to expectations.

In the following table are comparisons of the performance of commercially-available heating elements as claimed by the manufacturers compared to my invention.

| Element | T,° C | Hours | Loading Watts/sq. in. | Usefulness Watt Hours/sq. in. |
|---|---|---|---|---|
| SiC Type | 1650 | 600 | 20 | 12,000 at 1650 |
| MoSi₂ Type | 1800 | 1200 | 50 | 60,000 at 1800 |
| Pyrox 2000 | 1900 | 600 | 50 | 10,000 at 1900 |
| My Invention | 1900 | 346 | 200 | 69,200 at 1900 |

Like all Zirconia-base heating elements, my invention must be preheated to 1100° – 1200° C before conduction begins.

While I have illustrated one specific embodiment of my invention and have named specific materials, it will be understood that this is by way of illustration, and that various changes and modifications may be made therein.

I claim:

1. An electric resistance heating element for operating in oxidizing atmospheres to at least 1900° C, comprising a shaped element of stabilized $ZrO_2$ having a central heating section with long and larger terminal ends, said terminal ends being treated with liquid containing conduction-improving metal ions, incoming lead wires of high temperature metal alloy, being attached directly to, the terminal ends being surrounded with $ZrO_2$-base material containing conduction-improving oxides, and electrically insulating tubes attached directly to and covering most of the terminal ends and the $ZrO_2$-base material.

2. An electric resistance heating element according to claim 1, wherein the metal alloy is a material selected from the group consisting of nickel, iron and platinum base alloy.

3. An electric resistance heating element according to claim 1, wherein the conduction-improving oxides are materials selected from the group consisting of $NiO$, $Li_2O_1$, $Cr_2O_3$ and $TiO_2$.

4. An electric resistance heating element according to claim 1 wherein the heating section is composed of a plurality of resistors.

* * * * *